UNITED STATES PATENT OFFICE.

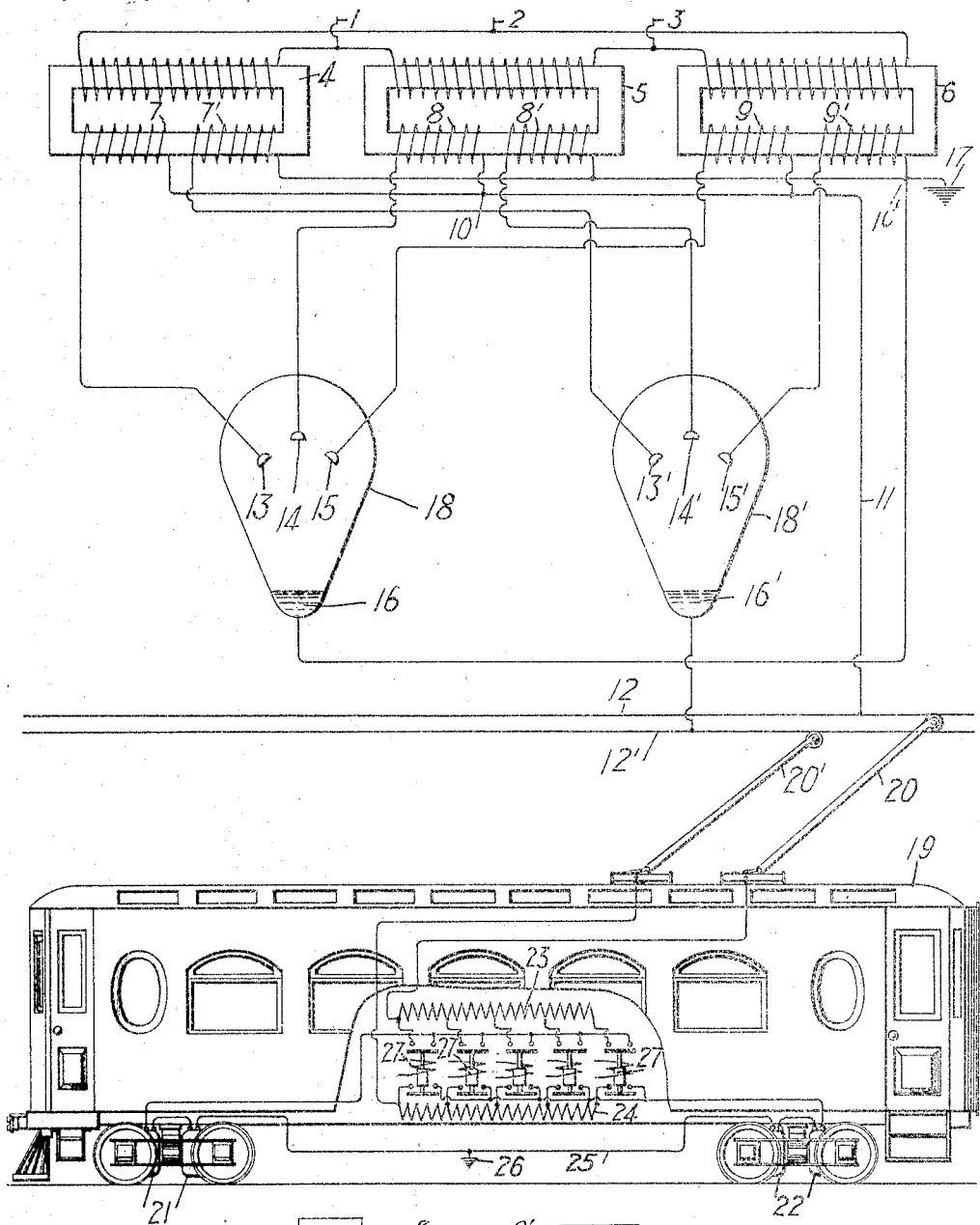

KARL A. SIMMON, OF WILKINSBURG, PENNSYLVANIA, ASSIGNOR TO WESTINGHOUSE ELECTRIC AND MANUFACTURING COMPANY, A CORPORATION OF PENNSYLVANIA.

RECTIFIER SYSTEM.

1,281,863.    Specification of Letters Patent.    Patented Oct. 15, 1918.

Application filed April 25, 1914. Serial No. 834,535.

*To all whom it may concern:*

Be it known that I, KARL A. SIMMON, a citizen of the United States, and a resident of Wilkinsburg, in the county of Allegheny and State of Pennsylvania, have invented a new and useful Improvement in Rectifier Systems, of which the following is a specification.

My invention relates to a system of power distribution and more specifically to a system of current supply for electric railways wherein power is transmitted in the form of high-potential alternating currents and is rectified and supplied to vehicle motors in the form of direct current, preferably of comparatively high voltage.

The object of my invention is to provide a system of the character specified wherein the power is transmitted with high efficiency and wherein the voltage strains are symmetrically distributed and their harmful possibilities reduced to a minimum.

Figure 1 of the accompanying drawing is a diagrammatic view of my improved system, and Fig. 2 is a simplified diagrammatic view of the circuits of Fig. 1.

Any convenient source of alternating currents, such, for example, as the mains 1, 2 and 3 of a three-phase transmission system, is connected to a set of transformers 4, 5 and 6, either in delta or in star connection. The transformers 4, 5 and 6 are respectively provided with two secondary windings 7—7', 8—8' and 9—9'. The secondary windings 7, 8 and 9 are star-connected and their neutral point 10 is connected, by a wire 11, to a current-distributing conductor 12 of an electric railway. The other terminals of the windings 7, 8 and 9 are connected to the anodes 13, 14 and 15, respectively, of any suitable rectifying device, such, for example, as a mercury-arc rectifier 18. The cathode 16 of the rectifier 18 is connected to ground, as shown at 17.

In a similar manner, the secondary windings 7', 8' and 9' are star-connected, their neutral point is grounded at 17 and their free terminals are connected to the anodes 13', 14' and 15' of a mercury-arc rectifier 18'. The cathode 16' of the rectifier 18' is connected to another current supply-conductor 12' of the electric railway having the conductor 12. 19 designates a vehicle of the electric railway provided with two current-collecting devices 20 and 20' and with an even number of motors, preferably four, shown at 21—21, 22—22. A speed-controlling rheostat for the motors 21—21 is shown at 23, and a similar rheostat for motors 22—22 is shown at 24. The rheostat 23 is connected between the current-collecting device 20 and the motors 21; the rheostat 24 is connected between the current-collecting device 20' and the motors 22; and a conductor 25 connects the two sets of motors to the ground shown at 26. The amount of resistance in circuit is controlled by contact devices 27—27 so arranged that they will simultaneously insert or remove like amounts of resistance in the two rheostats. This result may be attained by providing each contact device with two contact plates, as shown; or, if desired, one may employ two single-plate contact devices having their actuating windings in the same control circuit.

Having thus described the construction of my device, the operation is as follows: As is well known in the art, current will flow from the secondary windings of the transformers 4, 5 and 6 to the anodes of the rectifiers 18 and 18', to the cathodes 16 and 16' and thence outwardly, but will not flow in the reverse direction. Accordingly, since the cathode 16 is grounded, the current-supply conductor 12, connected to the neutral point 10, will be maintained at rectified voltage, for example, 1500 volts, above ground. In a similar manner, since the cathode of the rectifier 18' is connected to the current-supply conductor 12', and the neutral point 10' is grounded, the current-supply conductor 12' will be maintained at rectified voltage, for example, 1500 volts, below ground potential. Accordingly, the difference of potential between the current-supply conductors 12 and 12' will be 3000 volts, but it will be necessary to supply insulation between these conductors and ground to withstand a strain of only 1500 volts. Within the vehicle itself, the motors and their controlling resistances are, at all times, symmetrically distributed about the ground point 26 and, accordingly, no point within the vehicle will ever be at more than 1500 volts from ground potential, with a resultant low strain on the insulation.

Obviously, my system could be modified to derive its power from any other type of alternating current supply rather than from a three-phase transmission line and electrolytic or mechanical rectifiers could be substituted for the mercury-arc rectifiers 18—18' without departing from the spirit of my invention. Furthermore, any of the ordinary well known series-multiple systems of motor control may be employed on the car in place of the simple rheostatic control illustrated, provided it is so designed as to always maintain a symmetrical balance of the potential drop on each side of the ground point 26. Under conditions of perfect balance, there will be no current flow from the point 26 to the point 17 but if, for any reason, there should be a slight unbalancing, current will flow between these two points, as in the neutral of an ordinary three-wire system.

While I have illustrated and described the mid-point of my system as grounded if desired, a third conductor may be provided and I shall use the term "neutral" as covering either a metallic conductor or an earth return.

Having thus described my invention, what I claim is:

1. The combination with a three-wire, direct-current system of distribution, of a polyphase supply transformer provided with primary windings and with two sets of secondary windings, two rectifying units, means for connecting one of said units in circuit with one of said sets of secondary windings between the neutral wire of said three wire system and one outside wire thereof, and means for similarly connecting the remaining unit and set of secondary windings between said neutral wire and the remaining outside main.

2. The combination with a three-wire, direct-current system of distribution, of a polyphase supply transformer provided with primary windings and with two sets of secondary windings, two rectifying units, means for connecting one of said units in circuit with one of said sets of secondary windings between the neutral wire of said three wire system and one outside wire thereof, and means for similarly connecting the remaining unit and set of secondary windings between said neutral wire and the remaining outside main, the relative connections being such that a period of activity of each secondary winding of one set coincides with a period of inactivity of the cophasial secondary winding of the other set.

3. The combination with a three-wire, direct-current system of distribution, of a polyphase supply transformer provided with primary windings and two distinct sets of secondary windings, said sets being connected in opposed Y, two rectifying units, means for connecting one of said units in circuit with one of said sets of secondary windings between the neutral wire of said three-wire system and one outside wire thereof, and means for similarly connecting the remaining unit and set of secondary windings between said neutral wire and the remaining outside main.

In testimony whereof I have hereunto subscribed my name this 18th day of April, 1914.

KARL A. SIMMON.

Witnesses:
LYNN G. RILEY,
B. B. HINES.